Leighton & Severy,
Writing Slate.

Nº 83,645. Patented Nov. 3, 1868.

Witnesses.
S. N. Piper
J. B. Snow

Inventors.
S. Severy and R. F. Leighton
by their attorney
R. H. Eddy

ROBERT F. LEIGHTON AND SOLOMON SEVERY, OF MELROSE, MASSACHUSETTS.

Letters Patent No. 83,645, dated November 3, 1868.

IMPROVEMENT IN WRITING-SLATES.

The Schedule referred to in these Letters Patent and making part of the same.

*To all persons to whom these presents may come:*

Be it known that we, ROBERT F. LEIGHTON and SOLOMON SEVERY, of Melrose, in the county of Middlesex, and State of Massachusetts, have invented a new and useful Improvement in Writing-Slates or Tablets; and we do hereby declare the same to be fully described in the following specification, and represented in the accompanying drawings, of which—

Figure 1:
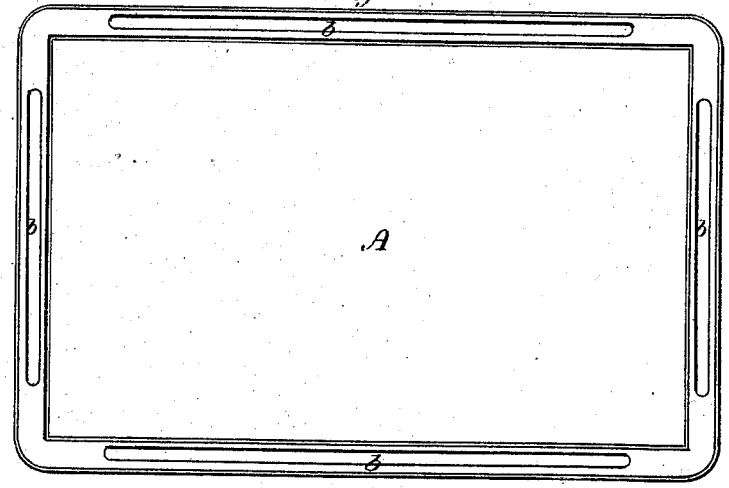
Figure 2:

Figure 1 is a top view;

Figure 2, a longitudinal section; and

Figure 3:
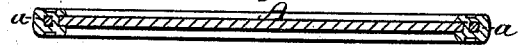

Figure 3, a transverse section of a slate, made in accordance with our invention.

Figure 4:
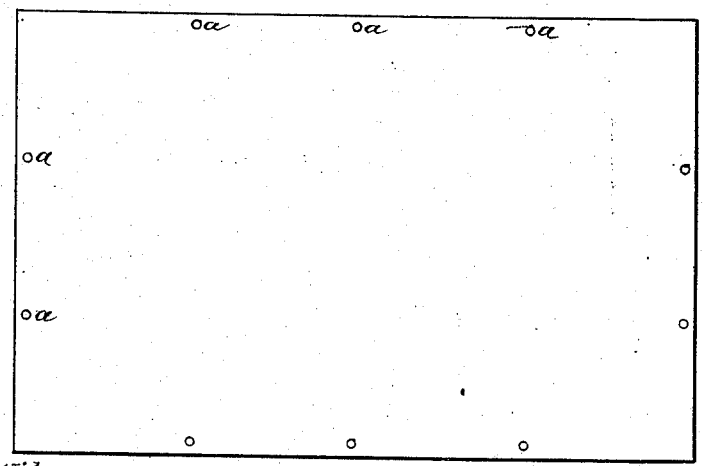

Figure 4 is a view of its mineral tablet.

The said tablet, shown at A, in figs. 1, 2, and 3, may be made either of slate, glass, or porcelain, or other suitable substance or composition.

In preparing it for reception of the frame, which is to be of India rubber, gutta-percha, or a vulcanizable composition, in which such may be a constituent, we make in the tablet, near its edges, a series of holes, the same being as shown at *a a a*, &c., in figs. 2, 3, and 4.

This tablet, so prepared, we lay in a mould, and cast upon it a gutta-percha or India-rubber frame, B, causing the composition or material so cast or moulded on the tablet, to pass through the holes of the tablet, and extend about its edges, and on its opposite sides, in manner as represented in the drawings.

Each side of the frame may be moulded with grooves in it, as shown at *b b*, such being both for ornamental and useful purposes. The material composing the frame should, after application to the tablet, be vulcanized by heat, in a manner well known to manufacturers of India-rubber or gutta-percha goods.

One great advantage of an India-rubber frame over one made of wood or metal, or other practically inelastic material, is, that, being of an elastic substance, it will prevent breakage of the tablet, in most cases, when the writing-slate may fall upon a hard object, the elastic property of the frame serving to prevent the concussion of the blow from disturbing the cohesion of the particles of the tablet.

Another advantage is, that it completely obviates the noise incident to slates having wooden frames, while being used or moved on a desk or table.

We make no claim to the invention of a writing-tablet, having a frame or border of India rubber, or its equivalent.

What we claim as our invention, is—

The improved manufacture of elastic-frame slate or writing-tablet, as made with the India rubber, or material of the frame, not only moulded upon the tablet about its edges, but through holes made through the tablet, and near to such edges, as set forth, such extensions of the rubber through the tablet serving to effectually prevent detachment of the frame from the tablet.

ROBERT F. LEIGHTON.
SOLOMON SEVERY.

Witnesses:
R. H. EDDY,
F. P. HALE, Jr.